United States Patent Office 3,135,664
Patented June 2, 1964

3,135,664
HAIR WAVING COMPOSITION COMPRISING THIOGLYCOLLIC ACID AND A CHELATING AGENT
Rodney D. Spitz and Allen K. Prince, Midland, Mich., assignors to The Dow Chemical Company, Midland, Mich., a corporation of Delaware
No Drawing. Filed Feb. 3, 1959, Ser. No. 790,801
2 Claims. (Cl. 167—87.1)

This invention relates to a liquid cold hair waving composition and more particularly to an improved formulation whereby discoloration of the solution is inhibited.

In the cold waving process the chemical solutions employed contain reducing agents having the function of converting the disulfide bond of the hair keratin of sulfhydryl groups. The reducing agents commonly employed have the unfortunate property of entering into side reactions with metal salts whereby the solution, which in the desirable condition is colorless and water white, becomes discolored. It has been noted for example, that the presence of trace amounts of soluble iron cause discoloration of the solution. Such gradual discoloration has become associated with the cold wave type preparation and seriously detracts from its commercial appeal.

Cold waving formulations usually contain several chemicals including a reducing agent, a wetting agent, opacifiers and odor modifying agents. The reducing agent often employed is ammonium thioglycollate, which is usually prepared by adding ammonium hydroxide to thioglycollic acid solution to form the ammonium salt and to effect adjustment of the pH. It has been observed that the reaction of thioglycollic acid and salts of this material form highly colored complexes with iron. Thus, the problem is almost spontaneous in that it is created by the properties of the very compounds it is desired to use, and the fact that traces of iron are essentially unavoidable in practice.

It is, accordingly, a fundamental object of this invention to provide a simple means for modifying cold waving compositions to render them resistant to spontaneous discoloration and attendant complications.

Other objects and advantages will in part be obvious and in part appear hereinafter.

The present invention resides in our discovery that the addition of certain specific chelating agents to cold wave preparations serves to prevent discoloration even when iron is present in the aqueous base. This unusual property is attributable to the formation of colorless iron complexes, which remain stable in solution and during the manipulations involved in actual hair waving.

We have found the formation of the highly colored metal complexes is prevented by incorporating a chelating agent based upon a dialkylenetriamine corresponding to the formula

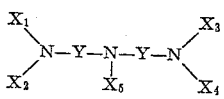

wherein $X_{1-5}$ are selected from the group consisting of H, —$CH_2COOH$, —$CH_2CH_2COOH$, alkali metal salts and ammonium base salts thereof and β-hydroxy alkyl groups, not more than one X thereof being β-hydroxyalkyl or H. Typical compounds useful for the purpose are diethylenetriamine pentaacetic acid, ditrimethylenetriamine pentaacetic acid, diethylenetriaminetetraacetic acid, ditrimethylenetriaminetetraacetic acid, monohydroxyethylditrimethylenetriaminetetraacetic acid, etc.

Y is merely a spacer group which interposes 2-3 carbon atoms between the indicated nitrogen atoms. Commonly it is ethylene, —$CH_2CH_2$—, but trimethylene, —$CH_2CH_2CH_2$—, methyl ethylene,

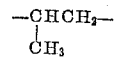

and cyclic groups such as cyclopentyl and cyclohexyl may also be used.

The practice of the invention will be better understood by reference to the following specific examples illustrating formulations of hair waving solutions which conform to this invention contrasted with those made in accordance with accepted technique.

Example I

A cold-wave lotion of the type embodied in this invention is prepared as follows: 9.8 grams of thioglycollic acid (regular 71 percent commercial material), 1.0 gram diethylenetriaminepentacetic acid, 8 milliliters ammonium hydroxide (regular concentrated 28 percent by weight $NH_3$ material) and 100 milliliters of water are mixed together. This formulation will have all the desirable properties of conventional hair wave solutions and will have the added advantage of being not adversely colored in cases of slight contamination by iron, which contamination is quite common and difficult to prevent.

Example II

The usefulness of the chelating agents as described herein is outlined as follows: Into each of six beakers were placed 9.8 grams of thioglycollic acid (71.23 percent by assay). Then, to each beaker in turn was added 0, 0.5, 1.0, 2.0, 4.0 and 6.0 grams of diethylenetriaminepentaacetic acid (aqueous solution of penta sodium diethylenetriaminepenta acetate of concentration equivalent to 40 percent) followed by 100 milliliters of water, containing only ferric sulfate at concentration to give 5 p.p.m. iron. Finally, to each beaker was added 8.0 milliliters of concentrated (28 percent by weight $NH_3$) ammonium hydroxide. These solutions were allowed to stand for several hours. Observation showed that the solutions containing progressively larger amounts of the chelating agent were progressively less-colored than the control sample, the maximum decrease in color being reached in the sample containing 2 grams of the agent, at which level the color is virtually completely removed. The standard, containing no chelating agent, was observed to possess the characteristic vivid violet color of the iron-thioglycollate complex.

Example III

Essentially the same procedure as in Example I above with the exception that the iron level was 10 p.p.m. in the water added and again virtually complete color removal was noted in the sample containing 2 grams of the diethylenetriamine pentaacetic acid.

Example IV

The procedure quite the same as the above examples, the iron contamination level being 10 p.p.m., but the diethylenetriamine pentaacetic acid was added at levels 0, 0.1, 0.2, 0.3, 0.4, 0.5 gram. These samples showed a regular and progressive decrease in color from highly colored to quite low levels in color.

Comparative tests of the group of polyamine amineacetic acid chelating agents defined and their effectiveness in the prevention of discoloring of the hair waving solution with simpler monomeric compounds, typified by ethylene-diaminetetraacetic acid and hydroxyethylethylene diaminetriacetic acid, indicate that the more complex polymer molecule is materially more effective in the prevention of color in the hair waving solution. It would appear that an explanation of this would be the fact that the more complex molecule would more fully satisfy the available coordination sites of the iron. However, with the simpler chelating agents referred to above, it appears that a sufficient number of reaction sites remain unoccupied following the reaction with the iron so that a dual effect is obtained in that the iron is bound, yet it is not fully complexed so as to develop the characteristic color of the complex iron compound.

With the addition in accordance with this invention of quantities of chelating agents in the amounts at least necessary to complex iron impurities occurring at the levels at which such contamination usually occurs, this problem disappears. The remainder of the formulation of the solution can be virtually the same as is accepted practice in the art. That is, the same fundamental ingredients are brought to essentially the same pH. This is largely because the chelating agents used in accordance with our invention are useful to form colorless complexes of iron at the pH ranges accepted for hair waving solutions.

This compounding of the hair waving solution is not limited to hair waving solutions which contain only the ammonium thioglycollate, but it is also readily applicable to those formulations which contain other buffering agents such as ammonium carbonate and ammonium chloride and which include high molecular weight amines, such as monoethanolamine, diethanolamine and triethanolamine as alkalizing agents.

One of the factors contributing to the effectiveness of the invention in extending the shelf life of the hair waving solution is that traces of iron contaminate hair waving solutions and catalyze the degradative oxidation of the thioglycollate compound. This effect is strongly inhibited by inactivation of the iron in accordance with this invention. Fundamentally, therefore, in the preparation of the hair waving solution in accordance with this invention, the solution should conform to about the following ranges of basic ingredients:

Thioglycollic acid _____ 5–10 percent by weight.

Penta sodium diethylenetriamine penta acetate, or other chelating agents as defined _____ 0.005–5 percent by weight.

Conventional buffering agents, e.g., other ammonium salts _____ 0–10 percent by weight.

Ammonium hydroxide (as concentrated or 28 percent $NH_3$ by weight material) _____ To give resultant pH range 8.0–10.0.

Balance water.

Solutions coming within the formulations outlined will be operative quite as effectively as conventional waving solutions, but will have an addition property of being unaffected by iron and heavy metal impurities in concentration ranges up to 20–25 parts per million and more.

Other hair waving compositions not based fundamentally on thioglycollic may be used. That is, it should be noted from the description of the invention that its efficacy resides in the capacity of the addition agent to form a substantially uncolored complex of iron, or other heavy metal contaminants which occur in the water, which complex may or may not be fully chelated metal ion, but, nevertheless, is a compound of the contaminating ion sufficiently stable to be effectively unreactive at the pH of the solution.

The preferred ranges in concentration for the solutions will depend on the end use of the hair waving solution which it is proposed to market; that is, the improvement is directed toward extending the shelf-life of the solution and, hence, the variables to be balanced are the stability of the complex, the level of color tolerable in the solution and the initial contamination of water with such extraneous matters as iron. Whether the solution is designed for home or professional use and also whether it is to be used on so-called hard-to-wave or easy-to-wave hair has bearing on its concentration. In general, solutions designed for professional use are more concentrated in the amount of ammonium thioglycollate and also are adjusted to a higher pH than are the home waving formulations. This same differential applies to home waving solutions for the so-called hard-to-wave hair.

For solutions which employ the higher pH levels, pH close to 10, it will be necessary to use the chelating agent in concentrations in the higher range recommended, that is, close to 5 percent; whereas in the home type formulations, the pH and corresponding concentrations will be in the lower portions of the ranges. It is generally true that the efficacy of the chelating agent for holding heavy metals in solution increases as the pH of the solution in which it is being used is reduced.

Despite the fact that the compositions of solution have been described in terms of sodium and ammonium salts of the chelating agents, it should be recognized that water soluble salts such as lithium, cesium and the like, would be useful. However, it is quite obvious that economics indicate the use of sodium ammonium salts.

Though the invention has been described with reference to only a limited number of examples, it is to be understood that variants thereof may be adopted without departing from its spirit or scope.

What is claimed is:

1. Hair waving solution, comprising a 5–10 percent aqueous thioglycollic acid solution characterized by its containing about 0.5 percent to about 5 percent of monohydroxyethyldiethylenetriaminetetraacetic acid chelating agent and ammonium hydroxide and buffering agents to give pH in the range from about 8 to 10.

2. A hair waving solution in accordance with claim 1 in which the chelating agent is monohydroxyethylditrimethylenetriaminetetraacetic acid.

References Cited in the file of this patent

UNITED STATES PATENTS 2,506,492    De Mytt et al. _____ May 2, 1950

OTHER REFERENCES

Martell: Chemistry of the Metal Chelate Compounds, Prentice-Hall Inc., Englewod Cliffs, N.J. (1952), pp. 381, 385, esp. p. 383.

Sequestrene, 54 p. brochure of Geigy Ind. Chems., Ardsley, N.Y. (1952), p. 21 relied on.

Bergy: Am. J. of Pharmacy, 126:6, June 1954, p. 212.

Harry: Modern Cosmeticology, 4th Ed., Leonard Hill Ltd., London (1955), pp. 457–458.